United States Patent
Van Marion et al.

(10) Patent No.: US 7,592,410 B2
(45) Date of Patent: Sep. 22, 2009

(54) POLYETHYLENE RESIN WITH NARROW PARTICLE SIZE DISTRIBUTION

(75) Inventors: Remko Van Marion, Vienna (AT); Bill Gustafsson, Stenungsund (DE); Mats Baeckman, Goeteborg (SE); Erik Van Praet, Holsbeek (BE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/913,633

(22) PCT Filed: Apr. 27, 2006

(86) PCT No.: PCT/EP2006/003945

§ 371 (c)(1),
(2), (4) Date: Apr. 24, 2008

(87) PCT Pub. No.: WO2006/119875

PCT Pub. Date: Nov. 16, 2006

(65) Prior Publication Data

US 2008/0241510 A1 Oct. 2, 2008

(30) Foreign Application Priority Data

May 6, 2005 (EP) .................. 05009984

(51) Int. Cl.
*C08F 10/10* (2006.01)
*C08F 2/34* (2006.01)
*C08F 2/38* (2006.01)

(52) U.S. Cl. .................. 526/348; 526/64; 526/65; 526/352; 526/909

(58) Field of Classification Search .............. 526/65, 526/909, 64, 348, 352
See application file for complete search history.

(56) References Cited

U.S. PATENT DOCUMENTS

| 5,326,835 | A | 7/1994 | Ahvenainen et al. |
| 6,185,349 | B1 | 2/2001 | Dammert et al. |

FOREIGN PATENT DOCUMENTS

| EP | 0517868 | 12/1992 |
| EP | 0688794 | 12/1995 |
| EP | 0778289 | 6/1997 |
| EP | 0810235 | 12/1997 |
| WO | 0022040 | 4/2000 |

*Primary Examiner*—Fred M Teskin
(74) *Attorney, Agent, or Firm*—Roberts Mlotkowski Safran & Cole, P.C.

(57) ABSTRACT

The present invention relates to a polyethylene resin comprising A) a first ethylene homo- or copolymer fraction, and B) a second ethylene homo- or copolymer fraction, wherein fraction (A) has a lower molecular weight than fraction (B), characterized in that the polymer resin powder obtained directly after the final polymerisation step has a particle size distribution $PSD_{95/5}$ equal to or smaller than 12. Furthermore, the invention relates to a process for the production of a polymer composition comprising: (i) a step in which ethylene monomers, and optionally further alpha-olefin-comonomers, are polymerised in liquid phase in the presence of a polymerisation catalyst, (ii) a step in which ethylene monomers, and optionally further alpha-olefin comonomers, are polymerised in the gas phase in the presence of a polymerisation catalyst, and (iii) obtaining a polymer resin powder after the final polymerisation step wherein the powder has a particle size distribution $PSD_{95/5}$ equal to or smaller than 12.

21 Claims, No Drawings

POLYETHYLENE RESIN WITH NARROW PARTICLE SIZE DISTRIBUTION

The present invention concerns a multimodal polyethylene resin comprising two polyethylene fractions having different molecular weight which, when taken directly from the reactor after the final polymerisation step, has a narrow particle size distribution. The invention furthermore relates to a process for the production of such a polyethylene resin and to a polyethylene resin obtainable by such a process.

It is known in the field of polyolefin production that in particular in polymerisation processes in which bi- or multimodal compositions are produced, the particle size of the polymer particles in the reactor is a key feature. Too many small polymer particles which are usually denoted as fines can foul compressors and other equipment, have a negative impact on the fluidisation in a (fluidised bed) gas phase reactor and can cause sintering effects leading to chunk formation. Also the product conveying is negatively influenced.

A solution to this problem has been proposed in EP 778 289, where it is described that the particle size distribution should be shifted towards larger particles so that small particles are avoided. However, a simple shift of the particle size distribution to higher values does not change the broadness of the distribution. A broad variation of particle sizes affects the fluidisation because particles with a size which deviates much from the average size behave significantly different in a fluidised bed. Threats of particles with such a relatively big (or small) size are the different reactivity, cooling capacity, possible sintering, etc. The consequence is that the particles have different polymer properties, known as chemical inhomogeneity.

Furthermore, also physical inhomogeneity due to different melt behaviour can result, e.g. formation of gels in the final product.

It is thus an object of the present invention to provide a process for the production of polyethylene wherein the polymer particles have a size distribution which is narrow so that the presence of both small and large (as compared to the average) polymer particles is avoided as far as possible.

The present invention therefore provides a polyethylene resin comprising
  A) a first ethylene homo- or copolymer fraction, and
  B) a second ethylene homo- or copolymer fraction,
wherein fraction (A) has a lower molecular weight than fraction (B), characterized in that the polymer resin powder obtained directly after the final polymerisation step has a particle size distribution $PSD_{95/5}$ equal to or smaller than 12.

The particle size distribution $PSD_{95/5}$ is defined as the ratio of two sizes $MPS_{95}$ and $MPS_5$, wherein said sizes are determined so that $MPS_{95}$ is the maximum particle size for those 95.0 volume (vol) % of the particles which have the smallest particles sizes in the powder, i.e. 95.0 vol % of the powder particles have a particle size equal to or smaller than $MPS_{95}$, and $MPS_5$ is the maximum particle size for those 5.0 vol % of the particles which have the smallest particles sizes in the powder, i.e. 5.0 vol % of the powder particles are smaller than $MPS_5$.

The $PSD_{95/5}$ is hence a measure for the broadness of the particle size distribution of the resin particles obtained after the last polymerisation step. The smaller the value for the $PSD_{95/5}$, the narrower is the particle size distribution of the polymer powder obtained. The present invention achieves a narrow particle size distribution indicated by small $PSD_{95/5}$ values. This means that less undesirable too small and too big particles are obtained. Thus, i.a. fluidisation of the polymer powder in the reactor and homogeneity of the final resin are improved. It is emphasized that the improved, narrow particle size is obtained for the reactor made product, i.e. without any separate fractionation step applied to the particles.

Preferably, the polymer resin powder obtained directly after the final polymerisation step has a particle size distribution $PSD_{95/5}$ equal to or smaller than 10, still more preferably has a particle size distribution $PSD_{95/5}$ equal to or smaller than 9, still more preferably has a particle size distribution $PSD_{95/5}$ equal to or smaller than 8, and most preferably has a particle size distribution $PSD_{95/5}$ equal to or smaller than 7.

In a further preferred embodiment, $MPS_{95}$ of the resin powder particles is 2000 micrometer or less, still more preferred is 1500 micrometer or less, still more preferred is 1000 micrometer or less, and most preferred is 600 micrometer or less.

Still further, $MPS_5$ of the resin powder particles preferably is 49 micrometer or more, more preferably is 54 micrometer or more.

Usually, a polyethylene resin comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Where herein features of fractions (A) and/or (B) of the resin of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, August 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

In the polyethylene resin of the invention, preferably the ratio of $MFR_2$ of fraction (A) to $MFR_5$ of the resin is 10 or higher, more preferably is 100 or higher and most preferably is 500 or higher.

Preferably, fraction (A) of the polyethylene resin has a $MFR_2$ of 10 g/10 min or higher, more preferably 50 g/10 min or higher and most preferably 100 g/10 min or higher.

In the polyethylene resin, fraction (A) preferably is present in an amount of from at least 20 wt %, more preferably at least 30 wt %.

Furthermore, fraction (A) preferably is present in the resin in an amount of up to 80 wt.-%, more preferably of up to 70 wt %.

Fraction (B) preferably is present in the resin in an amount of from at least 20 wt %, more preferably at least 30 wt %.

Furthermore, fraction (B) preferably is present in the resin in an amount of up to 80 wt.-%, more preferably of up to 70 wt %.

In a particularly preferred embodiment of the present invention, the polyethylene resin comprises a prepolymer ethylene homo- or copolymer fraction in an amount of up to 15 wt.-%, more preferably up to 10 wt % and most preferably up to 5 wt %.

In this embodiment, preferably the amount of prepolymer makes up 0.01 wt % or more, more preferably 0.1 wt % or more, of the total polyethylene resin.

The prepolymer fraction is made in a polymerisation step preceding the steps in which fraction (A) and (B) are produced. It has been found that the particle size distribution $PSD_{95/5}$ is still narrower and hence still less undesired too small and too big particles are obtained if the polyethylene resin comprises a prepolymer fraction. In particular, the amount of small particles (fines) can still be further reduced and hence higher $MPS_5$ values can be obtained.

Preferably, fraction (A) of the polyethylene resin is an ethylene homopolymer.

The density of fraction (A) preferably is from 915 to 980 kg/m³, more preferably from 940 to 980 kg/m³

Fraction (B) preferably is a copolymer of ethylene with one or more α-olefin-comonomers.

The alpha-olefin comonomer of fraction (B) and the base resin is preferably having from 4 to 8 carbon atoms and most preferably is selected from 1-butene, 1-hexene, 4-methyl-1-pentene and 1-octene.

The density of fraction (B) preferably is from 890 to 970 kg/m³, more preferably from 890 to 950 kg/m³.

The polyethylene resin preferably has a density from 915 to 970 kg/m³, more preferably from 920 to 960 kg/m³

Further, the resin preferably has an $MFR_5$ of 0.01 g/10 min or more, more preferably of 0.05 g/10 min or more.

Still further, resin preferably has an $MFR_5$ of 10 g/10 min or less, more preferably of 5 g/10 min or less, still more preferably of 2 g/10 min or less and most preferably of 1 g/10 min or less.

In a preferred embodiment the polyethylene resin has a shear thinning index $SHI_{(2.7/210)}$ of 5 or more, more preferably of 50 or more, and most preferred of 75 or more.

Further, the resin preferably has a shear thinning index $SHI_{(2.7/210)}$ of 300 or less.

The SHI is the ratio of the viscosity of the polyethylene composition at different shear stresses. In the present invention, the shear stresses at 2.7 kPa and 210 kPa are used for calculating the $SHI_{(2.7/210)}$ which may serve as a measure of the broadness of the molecular weight distribution.

Furthermore, the polyethylene resin preferably has a viscosity at a shear stress of 2.7 kPa $\eta_{(2.7)}$ of 10,000 to 500,000 Pas.

The polyethylene resin according the invention preferably is produced so that at least one of fractions (A) and (B), preferably (B), is produced in a gas-phase reaction.

Further preferred, one of the fractions (A) and (B) of the polyethylene resin, preferably fraction (A), is produced in a slurry reaction, preferably in a loop reactor, and one of the fractions (A) and (B), preferably fraction (B), is produced in a gas-phase reaction.

Further, the polyethylene resin preferably is produced in a multistage process. Polymer resins produced in such a process are also designated as "in-situ"-blends.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 15% by weight, preferably 1 to 10% by weight, more preferably 1 to 5% by weight, of the resin is produced.

The prepolymer is preferably an ethylene homopolymer (HDPE).

At the prepolymerisation, preferably all of the catalyst is charged into the reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, magnesium dichloride and aluminium.

Particularly preferred Ziegler-Natta catalysts are described in EP 0 810 235.

The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture.

It is preferred that the multimodal resin according to the invention is a bimodal polyethylene mixture consisting of fractions (A) and (B), optionally further comprising a small prepolymerisation fraction in the amount as described above.

It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer preferably having no content of comonomer is produced in one stage, preferably the first stage, owing to a high content of chain-transfer agent (hydrogen gas), whereas the high-molecular polymer preferably having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 75 to 115° C., more preferably is 80 to 105° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

The present invention furthermore provides a process for the production of a polymer composition comprising:
(i) a step in which ethylene monomers, and optionally further alpha-olefin-comonomers, are polymerised in liquid phase in the presence of a polymerisation catalyst,
(ii) a step in which ethylene monomers, and optionally further alpha-olefin comonomers, are polymerised in the gas phase in the presence of a polymerisation catalyst, and
(iii) obtaining a polymer resin powder after the final polymerisation step wherein the powder has a particle size distribution $PSD_{95/5}$ equal to or smaller than 12.

Preferably, polymerisation step (i) is carried out in slurry phase, preferably in a loop reactor.

Further preferred, steps (i) to (iii) are preceded by a prepolymerisation step.

Preferably, the ethylene polymer produced in stage (i) is an ethylene homopolymer.

Preferably, the ethylene polymer produced in stage (ii) is an ethylene/alpha-olefin copolymer.

The weight ratio of the products produced in stages (i)/(ii) preferably is from 20/80 to 80/20.

The polymerisation catalyst preferably is a Ziegler-Natta-catalyst.

Furthermore, all embodiments as described above for the production of the polymer powder of the invention are also preferred embodiments of the process of the invention.

For example, it is preferred that fraction (A) is produced in step (i) and fraction (B) is produced in step (ii) of the process of the invention.

The invention will be further explained by way of examples.

EXAMPLES

1. Definitions and Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

Density is measured according to ISO 1872, Annex A.

c) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

d) Rheological Parameters

Rheological parameters such as Shear Thinning Index SHI and Viscosity are determined by using a rheometer, preferably a Rheometrics Physica MCR 300 Rheometer. The definition and measurement conditions are described in detail on page 8 line 29 to page 11, line 25 of WO 00/22040.

e) Measurement of Particle Size Distribution

The particle size was measured using a Beckman Coulter LS 200 Laser Diffraction Particle Size Analyser.

The samples were prepared by mixing the polymer powder with isopropyl alcohol to a paste, which is further mixed in an ultra sound bath for 20-30 seconds.

The paste is added to the sample unit of the Coulter instrument which contains isopropyl alcohol. The recommended powder concentration is 8 to 12%. The size of the sample unit is 125 ml.

The analysis is performed according to the computer program of the software LS32, version 3.10.2002 of the instrument. The run length is 60 seconds. The calculation of the results is made by the software.

2. Polyethylene Resins

Production of polyethylene resins was performed in a multistage reaction comprising a first polymerisation stage in slurry in a 50 dm³ loop reactor, followed by transferring the slurry to a 500 dm³ loop reactor wherein polymerisation was continued in slurry to produce the low molecular weight component (fraction (A)), and a second polymerisation in a gas phase reactor in the presence of the product from the second loop reactor to produce the comonomer containing high molecular weight component (fraction (B)). As comonomer, butene-1 and hexene-1 have been used.

As a catalyst in all Examples 1 to 8, Lynx 200 available from Engelhard Corporation Pasadena, U.S.A. has been used for all examples according to the invention.

In comparative Examples 1 and 2, a catalyst prepared according to example 1 of EP 0 688 794 has been used.

The polymerisation conditions applied and the properties of the polymers obtained are listed in Table 1.

TABLE 1

| | Example 1 | Example 2 | Example 3 | Example 4 | Example 5 | Example 6 | Example 7 | Example 8 | C. Example 1 | C. Example 2 |
|---|---|---|---|---|---|---|---|---|---|---|
| PREPOLYMERIZER | | | | | | | | | | |
| Temperature, °C. | 40 | 40 | — | 40 | 40 | 40 | 40 | 40 | 70 | 70 |
| Pressure, bar | 58 | 59 | — | 63 | 61 | 60 | 61 | 62 | 65 | 65 |
| C2 feed, kg/h | 0.2 | 0.2 | — | 1.0 | 0.6 | 0.6 | 0.6 | 0.6 | 2.0 | 2.0 |
| H2 feed, g/h | 1.1 | 1.0 | — | 3.1 | 3.0 | 3.0 | 2.3 | 3.0 | 5.0 | 5.0 |
| Split, wt. % | 0.2 | 0.2 | 0 | 1.0 | 0.6 | 0.6 | 0.6 | 0.6 | 2.0 | 2.0 |
| LOOP | | | | | | | | | | |
| Temperature, °C. | 85 | 85 | 85 | 95 | 95 | 95 | 95 | 95 | 95 | 95 |
| Pressure, bar | 58 | 58 | 58 | 57 | 56 | 56 | 56 | 56 | 60 | 60 |
| H2/C2 ratio, mol/kmol | 620 | 515 | 578 | 502 | 491 | 503 | 482 | 475 | 500 | 420 |
| MFR$_2$, g/10 min | 600 | 210 | 450 | 300 | 350 | 450 | 450 | 450 | 440 | 480 |
| Split, wt. % | 39.8 | 39.5 | 46.6 | 50.8 | 50.7 | 51.1 | 48.6 | 48.5 | 46.0 | 42.0 |
| GPR | | | | | | | | | | |
| Temperature, °C. | 85 | 85 | 85 | 85 | 85 | 85 | 85 | 85 | 85 | 85 |
| Pressure, bar | 20 | 20 | 20 | 20 | 20 | 20 | 20 | 20 | 20 | 20 |
| H2/C2 ratio, mol/kmol | 5 | 5 | 6 | 6 | 1 | 1 | 16 | 22 | 10 | 12 |
| C4/C2 ratio, mol/kmol | 90 | 74 | 73 | 108 | | | | | 64 | |
| C6/C2 ratio, mol/kmol | | | | | 31 | 32 | 29 | 28 | | 46 |
| Split, wt. % | 60.0 | 60.3 | 53.4 | 49.2 | 48.7 | 48.3 | 50.8 | 50.9 | 52.0 | 56.0 |
| Comonomer | butene | butene | butene | butene | hexene | hexene | hexene | hexene | butene | hexene |
| FINAL PRODUCT | | | | | | | | | | |
| PSD 95/5 | 6.5 | 6.4 | 8.7 | 5.9 | 6.7 | 6.0 | 6.7 | 5.5 | 16.5 | 13.3 |
| MPS$_5$, µm | 63.37 | 68.69 | 49.71 | 68.23 | 58.1 | 54.29 | 55.64 | 67.41 | 41.54 | 53.52 |
| MPS$_{95}$, µm | 414 | 438.8 | 430.8 | 400.8 | 388.1 | 326 | 372.3 | 372 | 686.9 | 710.1 |
| MFR$_5$, g/10 min | 0.10 | 0.07 | 0.11 | 0.32 | 0.26 | 0.27 | 0.22 | 0.22 | 0.30 | 0.23 |
| MFR$_{21}$, g/10 min | 2.4 | 2.0 | 3.9 | 10.0 | 9.3 | 9.6 | 8.3 | 7.7 | 9.3 | 6.5 |
| FRR$_{21/5}$ | 24.5 | 28.6 | 35.5 | 31.3 | 35.8 | 35.6 | 37.7 | 35.0 | 31.0 | 28.3 |
| Density, g/cm³ | 943 | 944 | 947 | 945 | 946 | 947 | 947 | 948 | 949 | 944 |
| Mw, g/mol | | | | 315000 | 325000 | 370000 | | 355000 | | |
| Mn, g/mol | | | | 7700 | 6800 | 6700 | | 7300 | | |
| MWD | | | | 41 | 48 | 56 | | 48 | | |
| eta (2.7 kPa) | | | | 260 | 456 | 453 | | 411 | | |
| SHI (2.7/210) | | | | 97.6 | 175 | 220 | | 124 | | |
| MFR$_2$(A)/MFR$_5$ resin | 600 | 3000 | 4091 | 938 | 1346 | 1667 | 2045 | 2045 | 1467 | 2087 |

The invention claimed is:

1. A polyethylene resin comprising

A) a first ethylene homo- or copolymer fraction, and

B) a second ethylene homo- or copolymer fraction, wherein fraction (A) has a lower molecular weight than fraction (B), characterized in that polymer resin powder obtained directly after the final polymerization step has a particle size distribution PSD$_{95/5}$ equal to or smaller than 12.

2. Polyethylene resin according to claim 1 wherein the maximum particle size MPS$_{95}$ of the powder particles is 2000 micrometer or less.

3. Polyethylene resin according to claim 1 wherein the polymer resin powder obtained directly after the final polymerization step has a particle size distribution PSD$_{95/5}$ equal to or smaller than 10.

4. Polyethylene resin according to claim 3 wherein the polymer resin powder obtained directly after the final polymerization step has a particle size distribution PSD$_{95/5}$ equal to or smaller than 9.

5. Polyethylene resin according to claim 1 wherein the maximum particle size MPS$_{95}$ of the polymer resin powder particles is 1500 micrometer or less.

6. Polyethylene resin according to claim 1 wherein the ratio of MFR$_2$ of fraction (A) to MFR$_5$ of the resin is 10 or higher.

7. Polyethylene resin according to claim 1 wherein fraction (A) has a MFR$_2$ of 10 g/10 min or higher.

8. Polyethylene resin according to claim 1 wherein fraction (A) is present in the resin in an amount of 20 to 80 wt.-%.

9. Polyethylene resin according to claim 1 wherein fraction (B) is present in the resin in an amount of 20 to 80 wt.-%.

10. Polyethylene resin according to claim 1 wherein the resin further comprises a prepolymer ethylene homo- or copolymer fraction in an amount of up to 15 wt.-%.

11. Polyethylene resin according to claim 1 wherein the composition has an MFR$_5$ of 0.01 to 10 g/10 min.

12. Polyethylene resin according to claim 1 wherein fraction (B) has a MFR$_5$ of 1 g/10 min or lower.

13. Polyethylene resin according to claim 1 wherein the fraction (A) and (B) have been produced in a multistage process.

14. Polyethylene resin according to claim 13 wherein the multistage process comprises at least one gas phase stage.

15. A process for the production of a polymer composition comprising:
   (i) a step in which ethylene monomers, and optionally further alpha-olefin-comonomers, are polymerized in liquid phase in the presence of a polymerization catalyst,
   (ii) a step in which ethylene monomers, and optionally further alpha-olefin comonomers, are polymerized in the gas phase in the presence of a polymerization catalyst, and
   (iii) obtaining a polymer resin powder after the final polymerization step wherein the powder has a particle size distribution $PSD_{95/5}$ equal to or smaller than 12.

16. A process according to claim 15, wherein the polymerization step (i) is carried out in slurry phase.

17. A process according to claim 15, wherein steps (i) to (iii) are preceded by a prepolymerization step.

18. A process according to claim 15, wherein the weight ratio of the products produced in steps (i)/(ii) is from 20/80 to 80/20.

19. A process according to claim 15, wherein the polymerization catalyst is a Ziegler-Natta-catalyst.

20. A polyethylene resin obtained by a process according to claim 15.

21. A process according to claim 16, wherein the polymerization step (i) is carried out in a loop reactor.

* * * * *